United States Patent
Kitajima et al.

(10) Patent No.: US 12,489,484 B2
(45) Date of Patent: Dec. 2, 2025

(54) RADIO-FREQUENCY MODULE AND COMMUNICATION DEVICE

(71) Applicant: Murata Manufacturing Co., Ltd., Nagaokakyo (JP)

(72) Inventors: Hiromichi Kitajima, Nagaokakyo (JP); Takanori Uejima, Nagaokakyo (JP); Kiyoshi Aikawa, Nagaokakyo (JP); Yoshihiro Daimon, Nagaokakyo (JP); Takashi Yamada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 324 days.

(21) Appl. No.: 18/474,289

(22) Filed: Sep. 26, 2023

(65) Prior Publication Data

US 2024/0030956 A1    Jan. 25, 2024

Related U.S. Application Data

(63) Continuation of application No. PCT/JP2022/010815, filed on Mar. 11, 2022.

(30) Foreign Application Priority Data

Mar. 31, 2021   (JP) .................................. 2021-060346

(51) Int. Cl.
*H04B 1/38* (2015.01)
*H01Q 1/22* (2006.01)
(Continued)

(52) U.S. Cl.
CPC .............. *H04B 1/38* (2013.01); *H01Q 1/2283* (2013.01); *H01Q 1/38* (2013.01); *H01Q 15/24* (2013.01); *H03H 9/25* (2013.01); *H01Q 1/2208* (2013.01)

(58) Field of Classification Search
CPC .......... H04B 1/38; H01Q 1/2283; H01Q 1/38; H01Q 15/24; H01Q 1/2208; H03H 9/25
See application file for complete search history.

(56) References Cited

U.S. PATENT DOCUMENTS

| | | | | |
|---|---|---|---|---|
| 6,975,039 | B2 * | 12/2005 | Hasegawa | ............... H01L 23/13 |
| | | | | 257/E23.067 |
| 7,180,165 | B2 * | 2/2007 | Ellsberry | .............. H01L 25/105 |
| | | | | 438/109 |

(Continued)

FOREIGN PATENT DOCUMENTS

| | | |
|---|---|---|
| JP | 2002-084155 A | 3/2002 |
| JP | 2003-124701 A | 4/2003 |

(Continued)

OTHER PUBLICATIONS

International Search Report and Written Opinion mailed on May 31, 2022, received for PCT Application PCT/JP2022/010815, filed on Mar. 11, 2022, 14 pages including English Translation.

*Primary Examiner* — Lewis G West

(74) *Attorney, Agent, or Firm* — XSENSUS LLP

(57) ABSTRACT

A radio-frequency module includes: plural electronic components that include plural bare SAW devices and that are disposed between a major surface of a module substrate and a major surface of a module substrate, on a major surface of the module substrate, and on a major surface of the module substrate; plural external connection terminals disposed on the major surface; and resin members. The resin member covers the plural SAW devices but does not fill between central regions of the plural bare SAW devices in which the IDT electrodes are disposed and the major surface to which plural bump electrodes are joined. The plural bare SAW devices are disposed on the major surface, and no bare SAW devices are disposed between the major surfaces and on the major surface.

20 Claims, 8 Drawing Sheets

(51) Int. Cl.
*H01Q 1/38* (2006.01)
*H01Q 15/24* (2006.01)
*H03H 9/25* (2006.01)

(56) References Cited

U.S. PATENT DOCUMENTS

| | | | | |
|---|---|---|---|---|
| 7,245,883 | B2* | 7/2007 | Nakatani | H04B 1/525 |
| | | | | 370/282 |
| 8,552,622 | B2* | 10/2013 | Makibuchi | H01L 23/10 |
| | | | | 310/365 |
| 10,468,384 | B2* | 11/2019 | Yang | H01L 25/105 |
| 10,804,881 | B2* | 10/2020 | Urata | H03H 9/6489 |
| 11,239,821 | B2* | 2/2022 | Nomiya | H01L 25/065 |
| 11,758,815 | B2* | 9/2023 | Zhou | H10N 39/00 |
| | | | | 29/25.35 |
| 2002/0171508 | A1* | 11/2002 | Harada | H03H 7/463 |
| | | | | 333/133 |
| 2003/0048154 | A1* | 3/2003 | Satoh | H04B 1/50 |
| | | | | 333/133 |
| 2006/0194370 | A1* | 8/2006 | Lee | H05K 1/181 |
| | | | | 438/118 |
| 2008/0266023 | A1* | 10/2008 | Tanaka | H03H 9/725 |
| | | | | 333/133 |
| 2008/0296735 | A1* | 12/2008 | Takehara | H01L 23/642 |
| | | | | 257/621 |
| 2016/0248399 | A1* | 8/2016 | Oikawa | H10N 30/40 |
| 2017/0288123 | A1* | 10/2017 | Hatano | H03H 9/02992 |
| 2019/0035754 | A1* | 1/2019 | Uesaka | H10N 30/20 |
| 2019/0088621 | A1* | 3/2019 | Yang | H01L 25/0657 |
| 2020/0052676 | A1* | 2/2020 | Kawasaki | H03H 3/08 |
| 2020/0153409 | A1* | 5/2020 | Hsu | H01L 24/32 |
| 2021/0092214 | A1* | 3/2021 | Sawada | H04B 1/52 |
| 2021/0184704 | A1* | 6/2021 | Sawada | H05K 1/0243 |
| 2021/0391880 | A1* | 12/2021 | Onodera | H04B 1/0475 |
| 2022/0021126 | A1* | 1/2022 | Tanoue | H01L 25/18 |
| 2024/0015914 | A1* | 1/2024 | Daimon | H03F 3/195 |

FOREIGN PATENT DOCUMENTS

| | | |
|---|---|---|
| JP | 2005-110017 A | 4/2005 |
| JP | 2007-504676 A | 3/2007 |
| JP | 2009-182903 A | 8/2009 |
| JP | 2011-124366 A | 6/2011 |
| JP | 2011-198866 A | 10/2011 |
| JP | 2015-015546 A | 1/2015 |
| JP | 2020-507230 A | 3/2020 |
| WO | 2007/069606 A1 | 6/2007 |
| WO | 2018/168653 A1 | 9/2018 |
| WO | 2018/225590 A1 | 12/2018 |
| WO | 2020/022180 A1 | 1/2020 |
| WO | 2021/039014 A1 | 3/2021 |

* cited by examiner

RADIO-FREQUENCY MODULE AND COMMUNICATION DEVICE

CROSS-REFERENCE TO RELATED APPLICATIONS

This is a continuation application of PCT/JP2022/010815, filed on Mar. 11, 2022, designating the United States of America, which is based on and claims priority to Japanese Patent Application No. JP 2021-060346 filed on Mar. 31, 2021. The entire contents of the above-identified applications, including the specifications, drawings and claims, are incorporated herein by reference in their entirety.

TECHNICAL FIELD

The present disclosure relates to a radio-frequency module and a communication device.

BACKGROUND ART

In mobile communication devices, such as cellular phones, radio-frequency front-end modules are becoming more and more complicated with an increasing number of bands to be supported in particular. Patent Document 1 discloses a technique to reduce the size of a radio-frequency module by using two module substrates.

CITATION LIST

Patent Document

Patent Document 1: International Publication No. WO 2020/022180

SUMMARY OF DISCLOSURE

Technical Problem

According to the radio-frequency module in the related art, however, its production process can be complicated, and its production time can be increased.

The present disclosure provides a radio-frequency module and a communication device that can be produced with a simpler process in a shorter time.

Solution to Problem

A radio-frequency module according to an aspect of the present disclosure includes: a first module substrate including a first major surface and a second major surface that are opposite to each other; a second module substrate including a third major surface and a fourth major surface that are opposite to each other, the third major surface being disposed facing the second major surface; a plurality of electronic components disposed between the second major surface and the third major surface, on the first major surface, and on the fourth major surface; a plurality of external connection terminals disposed on the fourth major surface; and a resin member. The plurality of electronic components include a plurality of surface acoustic wave devices. Each of the plurality of surface acoustic wave devices includes: a piezoelectric substrate; a functional electrode disposed in a first region of a surface of the piezoelectric substrate; and a plurality of bump electrodes that are disposed in a second region of the surface surrounding the first region and that are joined to any one of the first major surface, the second major surface, the third major surface, and the fourth major surface. The resin member covers the plurality of surface acoustic wave devices but does not fill between each first region and any one of the first major surface, the second major surface, the third major surface, and the fourth major surface to which the plurality of bump electrodes are joined. The plurality of surface acoustic wave devices are disposed one of between the second major surface and the third major surface, on the first major surface, and on the fourth major surface. The surface acoustic wave devices are not disposed the other two of between the second major surface and the third major surface, on the first major surface, and on the fourth major surface.

Advantageous Effects of Disclosure

The radio-frequency module according to an aspect of the present disclosure can be produced in a simpler process in a shorter time.

DESCRIPTION OF EMBODIMENTS

Figure 1:
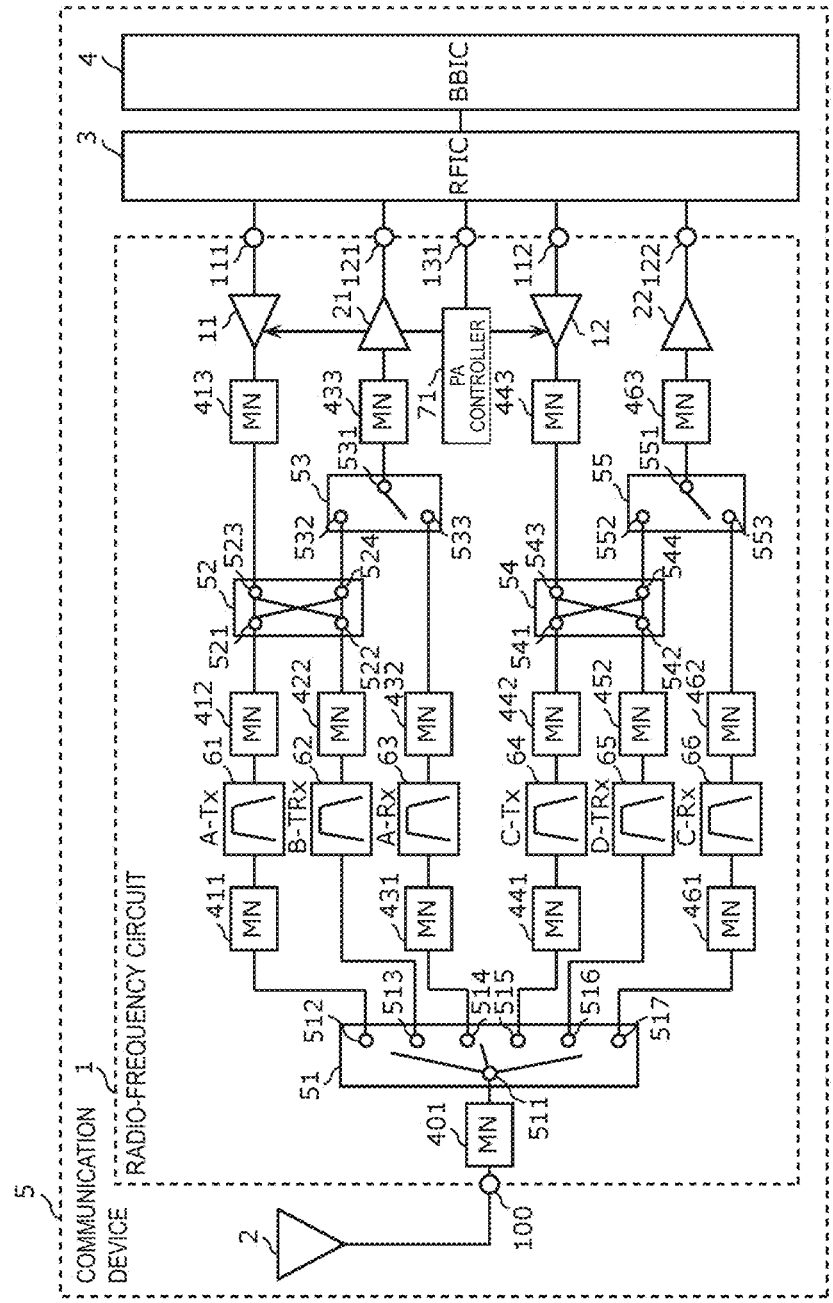
FIG. 1 is a circuit diagram of a radio-frequency circuit and a communication device according to an embodiment.

Hereinafter, an embodiment of the present disclosure is described in detail using the drawings. The embodiment described below illustrates a comprehensive or specific example. The numerical values, shapes, materials, constituent components, arrangements and connections of the constituent components, and the like described in the following embodiment are illustrative only and will not limit the present disclosure.

Each drawing is a schematic diagram including proper emphases, omissions, or adjustment of proportions in order to show the present disclosure and is not always illustrated exactly. The shapes, positional relationships, and proportions in each drawing are sometimes different from actual ones. In the drawings, substantially identical configurations are denoted by the same reference numerals, and redundant description may be omitted or simplified.

In each drawing below, x- and y-axes are orthogonal to each other on a plane parallel to the major surfaces of a module substrate. Specifically, assuming the module substrate is rectangular in a planar view, the x-axis is parallel to a first side of the module substrate, and the y-axis is parallel to a second side of the module substrate that is orthogonal to the first side. z-axis is vertical to the major surfaces of the module substrate, and the positive z-axis direction thereof is an upward direct while the negative z-axis direction is a downward direction.

In the circuit configuration of the present disclosure, "to be coupled" includes both being directly coupled with a connection terminal and/or a trace conductor and being electrically coupled via another circuit element. "To be coupled between A and B" indicates to be coupled to both A and B between A and B and includes, in addition to be coupled in series to a path connecting A and B, to be coupled in parallel between the path and ground (shunt connection).

In a component arrangement of the present disclosure, a "planar view" refers to a view of an object orthogonally projected onto an x-y plane as seen in the negative z-axis direction. "A overlaps B in a planar view" means that the region of A orthogonally projected onto the x-y plane overlaps the region of B orthogonally projected onto the x-y plane. "A is disposed between B and C" means that at least one of plural line segments connecting any point within B and any point within C passes through A. "A is joined to B" means that A is physically coupled to B. Terms indicating relationships between elements, such as "parallel" or "vertical", terms indicating element shapes, such as "rectangular", and numerical ranges express not only their exact meaning but also substantially equivalent ranges, for example, including several percent errors.

In component arrangements of the present disclosure, "a component is disposed in a substrate" includes the component being disposed on a major surface of the substrate and the component being disposed within the substrate. "A component is disposed on a major surface of a substrate" includes being disposed in contact with a major surface of the substrate or being disposed on a major surface side without being in contact with the major surface (for example, the component is stacked atop another component disposed in contact with the major surface). In addition, "a component is disposed on a major surface of a substrate" may include the component being within a recess formed in the major surface. "A component is disposed within a substrate" includes being encapsulated within the module substrate or being partially exposed from the substrate although the component being fully disposed between the major surfaces of the substrate and the component being partially disposed within the substrate. "A component is disposed between two major surfaces" includes being disposed in contact with both the two major surfaces or being disposed in contact with only one of the two major surfaces or disposed without being in contact with either of the two major surfaces.

EMBODIMENT

1 Circuit Configuration of Radio-Frequency Circuit 1 and Communication Device 5

The circuit configurations of a radio-frequency circuit 1 and a communication device 5 according to an embodiment are described with reference to FIG. 1. FIG. 1 is a circuit diagram of the radio-frequency circuit 1 and communication device 5 according to the embodiment.

1.1 Circuit Configuration of Communication Device 5

First, the circuit configuration of the communication device 5 is described. As illustrated in FIG. 1, the communication device 5 according to the embodiment includes the radio-frequency circuit 1, an antenna 2, a radio frequency integrated circuit (RFIC) 3, and a baseband integrated circuit (BBIC) 4.

The radio-frequency circuit 1 transfers radio-frequency signals between the antenna 2 and the RFIC 3. The internal configuration of the radio-frequency circuit 1 is described later.

The antenna 2 is coupled to an antenna connection terminal 100 of the radio-frequency circuit 1. The antenna 2 transmits a radio-frequency signal outputted from the radio-frequency circuit 1. The antenna 2 receives a radio-frequency signal from the outside and outputs the received radio-frequency signal to the radio-frequency circuit 1.

The RFIC 3 is an example of a signal processing circuit to process radio-frequency signals. Specifically, the RFIC 3 performs signal processing, such as down-conversion, for a radio-frequency reception signal inputted through a reception path of the radio-frequency circuit 1 and outputs to the BBIC 4, the reception signal generated through the signal processing. The RFIC 3 performs signal processing, such as up-conversion, for a transmission signal inputted from the BBIC 4 and outputs a radio-frequency transmission signal generated by the signal processing to a transmission path of the radio-frequency circuit 1. The RFIC 3 includes a controller to control switches, amplifiers, and other elements included in the radio-frequency circuit 1. Part of or all of the functions of the RFIC 3 as a controller may be implemented outside the RFIC 3 and, for example, may be implemented in the BBIC 4 or the radio-frequency circuit 1.

The BBIC 4 is a baseband signal processing circuit that performs signal processing using an intermediate frequency band lower than frequencies of radio-frequency signals transferred by the radio-frequency circuit 1. Examples of the signals to be processed by the BBIC 4 are image signals for image display and/or audio signals for voice calls using a speaker.

In the communication device 5 according to the embodiment, the antenna 2 and BBIC 4 are not essential constituent elements.

1.2 Circuit Configuration of Radio-Frequency Circuit 1

Next, the circuit configuration of the radio-frequency circuit 1 is described. As illustrated in FIG. 1, the radio-frequency circuit 1 includes power amplifiers (PAs) 11 and 12, low-noise amplifiers (LNAs) 21 and 22, matching networks (MN) 401, 411 to 413, 422, 431 to 433, 441 to 443, 452, and 461 to 463, switches (SWs) 51 to 55, filters 61 to 66, a PA controller (PAC) 71, the antenna connection terminal 100, radio-frequency input terminals 111 and 112, radio-frequency output terminals 121 and 122, and control terminal 131. Hereinafter, the constituent elements of the radio-frequency circuit 1 are described sequentially.

The antenna connection terminal 100 is coupled to the antenna 2 outside the radio-frequency circuit 1.

Each of the radio-frequency input terminals 111 and 112 is a terminal to receive radio-frequency transmission signals from the outside of the radio-frequency circuit 1. In the embodiment, the radio-frequency input terminals 111 and 112 are coupled to the RFIC 3 outside the radio-frequency circuit 1.

Each of the radio-frequency output terminals 121 and 122 is a terminal to supply radio-frequency reception signals to the outside of the radio-frequency circuit 1. In the embodiment, the radio-frequency output terminals 121 and 122 are coupled to the RFIC 3 outside the radio-frequency circuit 1.

The control terminal 131 is terminal to transfer control signals. Specifically, the control terminal 131 is terminal to receive control signals from the outside of the radio-frequency circuit 1 and/or terminals to supply control signals to the outside of the radio-frequency circuit 1. The control signals are signals concerning control of electronic circuits included in the radio-frequency circuit 1. Specifically, the control signals are digital signals to control at least one of the power amplifiers 11 and 12, low-noise amplifiers 21 and 22, and switches 51 to 55, for example.

The power amplifier 11 is coupled between the radio-frequency input terminal 111 and the filters 61 and 62 and is able to amplify transmission signals in bands A and B. Specifically, the input end of the power amplifier 11 is coupled to the radio-frequency input terminal 111. The output end of the power amplifier 11 is coupled to the filter 61 via the matching network 413, switch 52, and matching network 412. The output end of the power amplifier 11 is also coupled to the filter 62 via the matching network 413, switch 52, and matching network 422.

The power amplifier 12 is coupled between the radio-frequency input terminal 112 and the filters 64 and 65 and is able to amplify transmission signals in bands C and D. Specifically, the input end of the power amplifier 12 is coupled to the radio-frequency input terminal 112. The output end of the power amplifier 12 is coupled to the filter 64 via the matching network 443, switch 54, and matching network 442. The output end of the power amplifier 12 is also coupled to the filter 65 via the matching network 443, switch 54, and matching network 452.

Note that the power amplifiers 11 and 12 are electronic components that provide an output signal having a larger energy than an input signal (a transmission signal) based on power supplied from a power supply. Each of the power amplifiers 11 and 12 includes an amplification transistor and may further include an inductor and/or a capacitor. The internal configuration of the power amplifiers 11 and 12 are not limited. For example, each of the power amplifiers 11 and 12 may be a multistage amplifier, a differential amplifier, or a Doherty amplifier.

The low-noise amplifier 21 is coupled between the filter 62 and 63 and the radio-frequency output terminal 121 and is able to amplify reception signals in the bands A and B. Specifically, the input end of the low-noise amplifier 21 is coupled to the filter 62 via the matching network 433, switches 53 and 52, and matching network 422. The input end of the low-noise amplifier 21 is also coupled to the filter 63 via the matching network 433, switch 53, and matching network 432. The output end of the low-noise amplifier 21 is coupled to the radio-frequency output terminal 121.

The low-noise amplifier 22 is coupled between the filters 65 and 66 and the radio-frequency output terminal 122 and is able to amplify reception signals in the bands C and D. Specifically, the input end of the low-noise amplifier 22 is coupled to the filter 65 via the matching network 463, switches 55 and 54, and matching network 452. The input end of the low-noise amplifier 22 is also coupled to the filter 66 via the matching network 463, switch 55, and matching network 462. The output end of the low-noise amplifier 22 is coupled to the radio-frequency output terminal 122.

The low-noise amplifiers 21 and 22 are electronic components that provide an output signal having a larger energy than that of an input signal (a reception signal) based on power supplied from the power supply. Each of the low-noise amplifiers 21 and 22 includes an amplification transistor and may further include an inductor and/or a capacitor. The internal configurations of the low-noise amplifiers 21 and 22 are not limited.

Each of the matching networks 401, 411 to 413, 422, 431 to 433, 441 to 443, 452, and 461 to 463 is coupled between two circuit elements and is able to provide impedance matching between the two circuit elements. Thus, each of the matching networks 401, 411 to 413, 422, 431 to 433, 441 to 443, 452, and 461 to 463 is an impedance matching network. Each of the matching networks 401, 411 to 413, 422, 431 to 433, 441 to 443, 452, and 461 to 463 includes an inductor and may further include a capacitor.

The switch 51 is coupled between the antenna connection terminal 100 and the filters 61 to 66. The switch 51 includes terminals 511 to 517. The terminal 511 is coupled to the antenna connection terminal 100. The terminal 512 is coupled to the filter 61 via the matching network 411. The terminal 513 is coupled to the filter 62. The terminal 514 is coupled to the filter 63 via the matching network 431. The terminal 515 is coupled to the filter 64 via the matching network 441. The terminal 516 is coupled to the filter 65. The terminal 517 is coupled to the filter 66 via the matching network 461.

In this connection configuration, the switch 51 is able to connect the terminal 511 to at least one of the terminals 512 to 517 based on a control signal from the RFIC 3, for example. The switch 51 is able to switch whether to couple the antenna connection terminal 100 to each of the filters 61 to 66. The switch 51 is composed of a multi-connection switch circuit, for example, and is sometimes referred to as an antenna switch.

The switch 52 is coupled between the output end of the power amplifier 11 and the filters 61 and 62 and is coupled between the input end of the low-noise amplifier 21 and the filter 62. The switch 52 includes terminals 521 to 524. The terminal 521 is coupled to the filter 61 via the matching network 412. The terminal 522 is coupled to the filter 62 via the matching network 422. The terminal 523 is coupled to the output end of the power amplifier 11 via the matching network 413. The terminal 524 is coupled to the input end of the low-noise amplifier 21 via the switch 53 and matching network 433.

In this connection configuration, the switch 52 is able to couple the terminal 523 to at least one of the terminals 521 and 522 and couple the terminal 522 to at least one of the terminals 523 and 524 based on a control signal from the RFIC 3, for example. The switch 52 is able to switch whether to couple the power amplifier 11 to each of the filters 61 and 62 and is able to switch connections between the filter 62 and the power amplifier 11 and between the filter 62 and the low-noise amplifier 21. The switch 52 is composed of a multi-connection switch circuit, for example.

The switch 53 is coupled between the input end of the low-noise amplifier 21 and the filters 62 and 63. The switch 53 includes terminals 531 to 533. The terminal 531 is coupled to the input end of the low-noise amplifier 21 via the matching network 433. The terminal 532 is coupled to the terminal 524 of the switch 52 and is coupled to the filter 62 via the switch 52 and matching network 422. The terminal 533 is coupled to the filter 63 via the matching network 432.

In this connection configuration, the switch 53 is able to couple the terminal 531 to at least one of the terminals 532 and 533 based on a control signal from the RFIC 3, for example. The switch 53 is thus able to switch whether to couple the low-noise amplifier 21 to each of the filters 62 and 63. The switch 53 is composed of a multi-connection switch circuit, for example.

The switch 54 is coupled between the output end of the power amplifier 12 and the filters 64 and 65 and is coupled between the input end of the low-noise amplifier 22 and the filter 65. The switch 54 includes terminals 541 to 544. The terminal 541 is coupled to the filter 64 via the matching network 442. The terminal 542 is coupled to the filter 65 via the matching network 452. The terminal 543 is coupled to the output end of the power amplifier 12 via the matching network 443. The terminal 544 is coupled to the input end of the low-noise amplifier 22 via the switch 55 and matching network 463.

In this connection configuration, the switch 54 is able to couple the terminal 543 to at least one of the terminals 541 and 542 and couple the terminal 542 to either the terminal 543 or 544 based on a control signal from the RFIC 3, for example. The switch 54 is thus able to switch whether to couple the power amplifier 12 to each of the filters 64 and 65 and switch connections between the filter 65 and the power amplifier 12 and between the filter 65 and the low-noise amplifiers 22. The switch 54 is composed of a multi-connection switch circuit, for example.

The switch 55 is coupled between the input end of the low-noise amplifier 22 and the filters 65 and 66. The switch 55 includes terminals 551 to 553. The terminal 551 is coupled to the input end of the low-noise amplifier 22 via the matching network 463. The terminal 552 is coupled to the terminal 544 of the switch 54 and is coupled to the filter 65 via the switch 54 and matching network 452. The terminal 553 is coupled to the filter 66 via the matching network 462.

In this connection configuration, the switch 55 is able to couple the terminal 551 to at least one of the terminals 552 and 553 based on a control signal from the RFIC 3, for example. The switch 55 is thus able to switch whether to couple the low-noise amplifier 22 to each of the filters 65 and 66. The switch 55 is composed of a multi-connection switch circuit, for example.

The filter 61 (A-Tx) is coupled between the power amplifier 11 and the antenna connection terminal 100. Specifically, an end of the filter 61 is coupled to the antenna connection terminal 100 via the matching network 411, switch 51, and matching network 401. The other end of the filter 61 is coupled to the output end of the power amplifier 11 via the matching network 412, switch 52, and matching network 413. The filter 61 has a pass band including an uplink operation band of the band A for frequency division duplex (FDD) and is able to pass transmission signals in the band A.

The filter 62 (B-TRx) is coupled between the antenna connection terminal 100 and the power amplifier 11 and is coupled between the antenna connection terminal 100 and the low-noise amplifier 21. Specifically, an end of the filter 62 is coupled to the antenna connection terminal 100 via the switch 51 and matching network 401. The other end of the filter 62 is coupled to the output end of the power amplifier 11 via the matching network 422, switch 52, and matching network 413 and is coupled to the input end of the low-noise amplifier 21 via the matching network 422, switches 52 and 53, and matching network 433. The filter 62 has a pass band including the band B for time division duplex (TDD) and is able to pass transmission and reception signals in the band B.

The filter 63 (A-Rx) is coupled between the low-noise amplifier 21 and the antenna connection terminal 100. Specifically, an end of the filter 63 is coupled to the antenna connection terminal 100 via the matching network 431, switch 51, and matching network 401. The other end of the filter 63 is coupled to the input end of the low-noise amplifier 21 via the matching network 432, switch 53, and matching network 433. The filter 63 has a pass band including a downlink operation band of the band A for FDD and is able to pass reception signals in the band A.

The filter 64 (C-Tx) is coupled between the power amplifier 12 and the antenna connection terminal 100. Specifically, an end of the filter 64 is coupled to the antenna connection terminal 100 via the matching network 441, switch 51, and matching network 401. The other end of the filter 64 is coupled to the output end of the power amplifier 12 via the matching network 442, switch 54, and matching network 443. The filter 64 has a pass band including an uplink operation band of the band C for FDD and is able to pass transmission signals in the band C.

The filter 65 (D-TRx) is coupled between the antenna connection terminal 100 and the power amplifier 12 and is coupled between the antenna connection terminal 100 and the low-noise amplifier 22. Specifically, an end of the filter 65 is coupled to the antenna connection terminal 100 via the switch 51 and matching network 401. The other end of the filter 65 is coupled to the output end of the power amplifier 12 via the matching network 452, switch 54, and matching network 443 and is coupled to the input end of the low-noise amplifier 22 via the matching network 452, switches 54 and 55, and matching network 463. The filter 65 has a pass band including the band D for TDD and is able to pass transmission and reception signals in the band D.

The filter 66 (C-Rx) is coupled between the low-noise amplifier 22 and the antenna connection terminal 100. Specifically, an end of the filter 66 is coupled to the antenna connection terminal 100 via the matching network 461, switch 51, and matching network 401. The other end of the filter 66 is coupled to the input end of the low-noise amplifier 22 via the matching network 462, switch 55, and matching network 463. The filter 66 has a pass band including a downlink operation band of the band C for FDD and is able to pass reception signals in the band C.

The PA controller 71 is able to control the power amplifiers 11 and 12. The PA controller 71 receives digital control signals from the RFIC 3 via the control terminal 131 and outputs control signals to the power amplifiers 11 and 12.

The bands A to D are frequency bands for communication systems built by using a radio access technology (RAT). The bands A to D are previously defined by a standards body or the like (the 3rd Generation Partnership Project (3GPP) or the Institute of Electrical and Electronics Engineers (IEEE), for example). Examples of the communication systems are a 5th generation new radio (5GNR) system, a long term evolution (LTE) system, and a wireless local area network (WLAN) system.

The bands A and B may be included in a different band group from the bands C and D or may be included in the same band group. Herein, a band group indicates a range of frequencies including plural bands. Band groups can be an ultra-high band group (3300 to 5000 MHz), a high-band group (2300 to 2690 MHz), a mid-band group (1427 to 2200 MHz), and a low-band group (698 to 960 MHz), for example, but are not limited thereto. For example, the band groups may include a band group including an unlicensed band not lower than 5 GHz or a band group in the millimeter wave band.

For example, the bands A and B may be included in the high-band group while the bands C and D are included in the mid-band group. Alternatively, the bands A and B may be included in the mid- or high-band group while the bands C and D are included in the low-band group.

The radio-frequency circuit 1 is illustrated by way of example in FIG. 1 and is not limited thereto. For example, the bands covered by the radio-frequency circuit 1 are not limited to the bands A to D. For example, the radio-frequency circuit 1 may be configured to cover five bands or more. In this case, the radio-frequency circuit 1 may include filters for bands E, F, G . . . . Alternatively, for example, the radio-frequency circuit 1 may be configured to cover only the bands A and B but not the bands C and D. In this case, the radio-frequency circuit 1 does not need to include the power amplifier 12, low-noise amplifier 22, matching networks 441 to 443, 452, and 461 to 463, radio-frequency input terminal 112, and radio-frequency output terminal 122. For example, the radio-frequency circuit 1 may be a send-only circuit. In this case, the radio-frequency circuit 1 does not need to include the low-noise amplifiers 21 and 22, matching networks 431 to 433 and 461 to 463, switches 53 and 55, filters 63 and 66, and radio-frequency output terminals 121 and 122. Alternatively, for example, the radio-frequency circuit 1 may be a receive-only circuit. In this case, the radio-frequency circuit 1 does not need to include the power amplifiers 11 and 12, matching networks 411 to 413 and 441 to 443, switches 52 and 54, filters 61 and 64, and radio-frequency input terminals 111 and 112.

The radio-frequency circuit 1 does not need to include all the matching networks 401, 411 to 413, 422, 431 to 433, 441 to 443, 452, and 461 to 463. Furthermore, the radio-frequency circuit 1 may be coupled to plural antennas and may include plural antenna connection terminals, for example. The radio-frequency circuit 1 may include more radio-frequency input terminals. In this case, a switch that is able to switch connections between the power amplifiers and the plural radio-frequency input terminals may be provided between the power amplifiers and the plural radio-frequency input terminals. The radio-frequency circuit 1 may include more radio-frequency output terminals. In this case, a switch that is able to switch connections between the low-noise amplifiers and the plural radio-frequency output terminals may be provided between the low-noise amplifiers and the plural radio-frequency output terminals.

2 Example of Radio-Frequency Circuit 1

2.1 Example 1

As Example 1 of the radio-frequency circuit 1 according to the embodiment, a radio-frequency module 1A, in which the radio-frequency circuit 1 is implemented, is described with reference to FIGS. 2 to 5.

2.1.1 Component Arrangement of Radio-Frequency Module 1A

Figure 2:
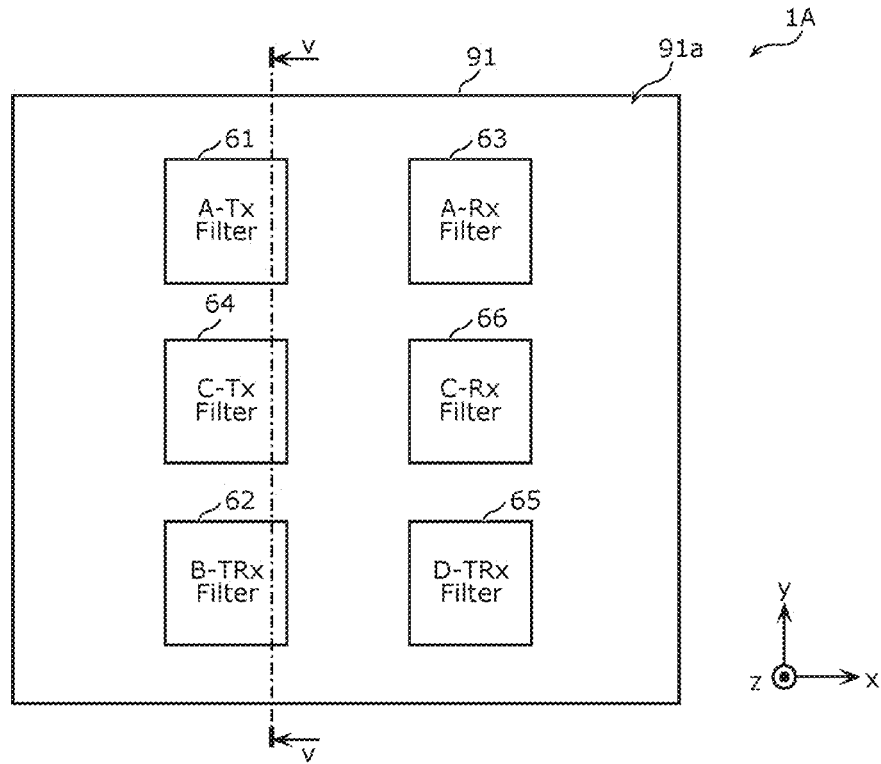
FIG. 2 is a plan view of a first major surface of a radio-frequency module according to Example 1.
Figure 3:
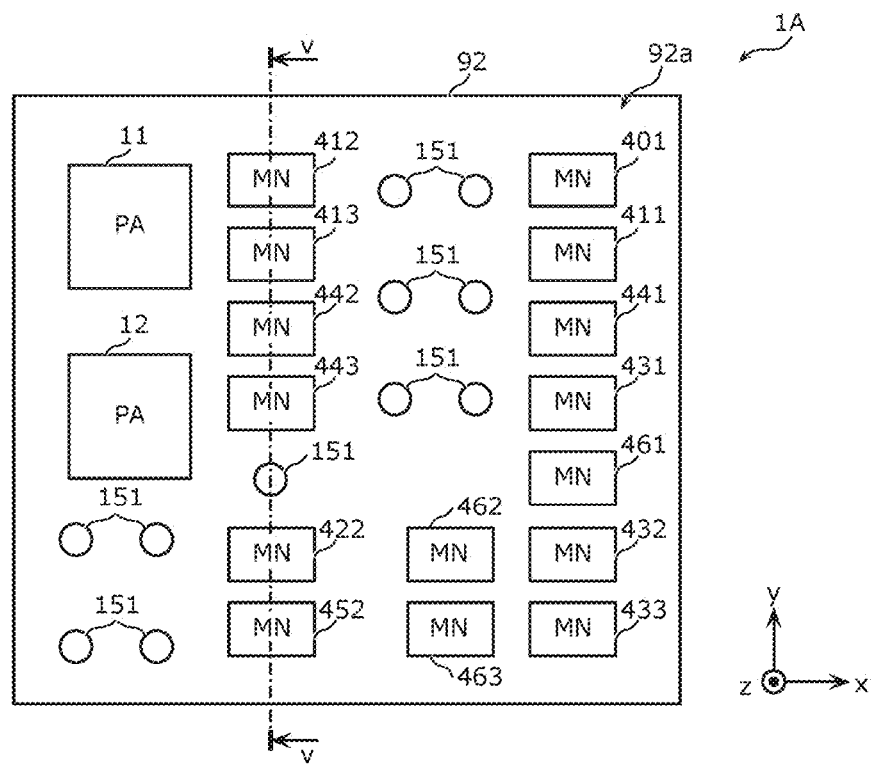
FIG. 3 is a plan view of a second major surface of the radio-frequency module according to Example 1.
Figure 4:
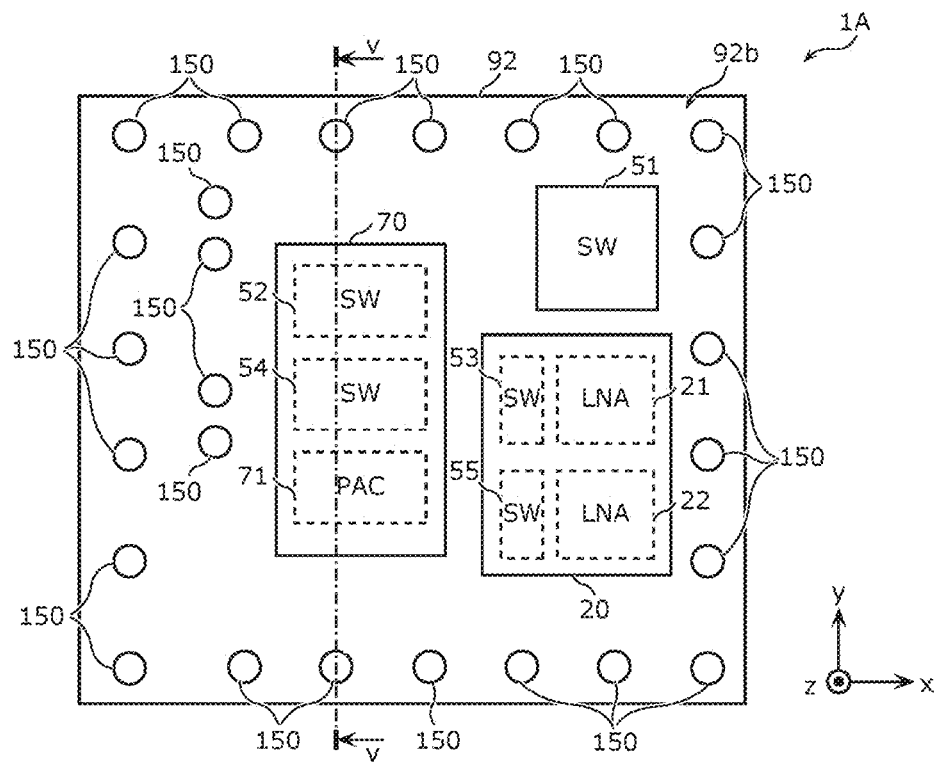
FIG. 4 is a plan view of a fourth major surface of the radio-frequency module according to Example 1.
Figure 5:
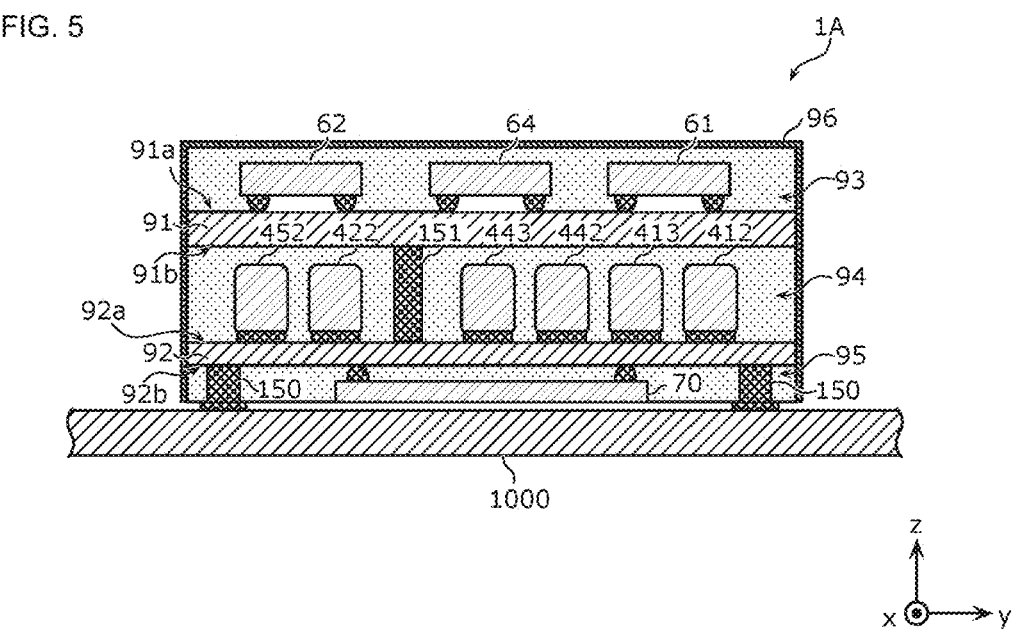
FIG. 5 is a cross-sectional view of the radio-frequency module according to Example 1.

FIG. 2 is a plan view of a major surface 91a of the radio-frequency module 1A according to Example 1. FIG. 3 is a plan view of a major surface 92a of the radio-frequency module 1A according to Example 1. FIG. 3 is a view seen through the major surface 92a side of a module substrate 91 as seen in the positive z-axis direction. FIG. 4 is a plan view of a major surface 92b of the radio-frequency module 1A according to Example 1. FIG. 4 is a view seen through the major surface 92b side of a module substrate 92 as seen in the positive z-axis direction. FIG. 5 is a cross-sectional view of the radio-frequency module 1A according to Example 1. The cross section of the radio-frequency module 1A in FIG. 5 is taken along a line v-v of FIGS. 2 to 4.

FIGS. 2 to 5 do not illustrate traces connecting plural electronic components disposed in the module substrates 91 and 92. FIGS. 2 to 4 do not illustrate resin members 93 to 95 covering plural electronic components and a shield electrode layer 96, which covers the surfaces of the resin members 93 to 95.

In addition to the plural electronic components including the plural circuit elements illustrated in FIG. 1, the radio-frequency module 1A includes the module substrates 91 and 92, the resin members 93 to 95, the shield electrode layer 96, plural external connection terminals 150, and plural inter-substrate connection terminals 151.

The module substrate 91 is an example of a first module substrate and includes the major surfaces 91a and 91b, which are opposite to each other. The major surfaces 91a and 91b are examples of first and second major surfaces, respectively.

The module substrate 92 is an example of a second module substrate and includes the major surfaces 92a and 92b, which are opposite to each other. The major surfaces 92a and 92b are examples of third and fourth major surfaces, respectively.

The module substrates 91 and 92 are disposed so that the major surface 91b of the module substrate 91 faces the major surface 92a of the module substrate 92. The module substrates 91 and 92 are disposed at such a distance that the electronic components can be disposed between the major surfaces 91b and 92a. The plural electronic components are disposed in the two module substrates 91 and 92 and, specifically, are separated into three layers: between the major surfaces 91b and 92a; on the major surface 91a; and on the major surface 92b.

In FIGS. 2 to 5, the module substrates 91 and 92 have rectangular shapes of the same size in a planar view. The module substrates 91 and 92 may have different sizes and/or different shapes. The shapes of the module substrates 91 and 92 are not limited to rectangles.

Each of the module substrates 91 and 92 can be, but not limited to, a low temperature co-fired ceramic (LTCC) substrate or a high temperature co-fired ceramic (HTCC) substrate, which includes a laminate structure of plural dielectric layers, an embedded printed circuit board, a substrate including a redistribution layer (RDL), a printed circuit board, or the like, for example.

On the major surface 91a (the upper layer), the filters 61 to 66 are disposed. Each of the filters 61 to 66 is composed of a surface acoustic wave (SAW) device. More specifically, each of the filters 61 to 66 is composed of a bare SAW device with a functional electrode formed on the surface of the device. Such bare SAW devices are not disposed between the major surfaces 91b and 92a and on the major surface 92b. The bare SAW devices are thus disposed in the upper layer of the three layers. The configuration of the bare SAW devices is described later using FIGS. 6 and 7.

The resin member 93 covers the major surface 91a and the electronic components on the major surface 91a. The resin member 93 has a function of enhancing the reliability, including mechanical strength and moisture resistance, of the electronic components on the major surface 91a.

Between the major surfaces 91b and 92a (the middle layer), the power amplifiers 11 and 12, matching networks (chip inductors) 401, 411 to 413, 422, 431 to 433, 441 to 443, 452, and 461 to 463, and plural inter-substrate connection terminals 151 are disposed. Each of the plural electronic components (herein, the power amplifiers 11 and 12 and matching networks (chip inductors) 401, 411 to 413, 422, 431 to 433, 441 to 443, 452, and 461 to 463) disposed between the major surfaces 91b and 92a includes electrodes on the side facing the module substrate 92 and is electrically coupled to the module substrate 92 with the electrodes interposed therebetween.

The power amplifiers 11 and 12 are composed of complementary metal oxide semiconductors (CMOSs), for example, and specifically, can be manufactured by a silicon-on-insulator (SOI) process. The power amplifiers 11 and 12 can be thereby manufactured at low cost. The power amplifiers 11 and 12 may be composed of at least one of gallium arsenide (GaAs), silicon germanium (SiGe), and gallium nitride (GaN). This can implement the power amplifiers 11 and 12 of high quality.

Each of the matching networks 401, 411 to 413, 422, 431 to 433, 441 to 443, 452, and 461 to 463 is composed of a chip inductor. The chip inductors are surface mount devices (SMDs) each constituting an inductor. The chip inductors are disposed on the major surface 91a. In this case, no chip inductors are disposed on the major surface 91a and on the major surface 92b. In other words, the chip inductors are disposed in the middle layer of the three layers.

Each matching network may include a chip inductor or a chip capacitor. All the matching networks are not necessarily surface-mounted. For example, an inductor and/or a capacitor included in any matching network may be formed within the module substrate 91 and/or 92.

The plural inter-substrate connection terminals 151 are electrodes for electrically coupling the module substrates 91 and 92. Some of the inter-substrate connection terminals 151 overlap the power amplifier 11 or 12 in a planar view and are coupled to the external connection terminals 150 to serve as heat dissipation electrodes of the power amplifiers 11 and 12. The inter-substrate connection terminals 151 are composed of copper post electrodes, for example. The shape and material of the inter-substrate connection terminals 151 are not limited thereto.

On the major surface 92b (the lower layer), the integrated circuits 20 and 70, switch 51, and plural external connection terminals 150 are disposed.

The resin member 94 covers the major surfaces 91b and 92a and the electronic components between the major surfaces 91b and 92a. The resin member 94 has a function of enhancing the reliability, including mechanical strength and moisture resistance, of the electronic components between the major surfaces 91b and 92a.

The integrated circuit 20 includes the low-noise amplifiers 21 and 22 and switches 53 and 55. The circuit elements constituting the low-noise amplifiers 21 and 22 and switches 53 and 55 are formed in the circuit surface of the integrated circuit 20. The circuit surface is, for example, a major surface of the integrated circuit 20 that faces the module substrate 92.

The integrated circuit 70 includes the switches 52 and 54 and the PA controller 71. The circuit elements constituting the switches 52 and 54 and the PA controller 71 are formed in the circuit surface of the integrated circuit 70. The circuit surface is, for example, a major surface of the integrated circuit 70 that faces the module substrate 92.

The integrated circuit 20 and/or 70 is composed of a CMOS, for example, and specifically, may be manufactured by a SOI process. The integrated circuit 20 and/or 70 may be composed of at least one of GaAs, SiGe, and GaN.

The switch 51 is composed as a switch device. The circuit element constituting the switch 51 is formed in the circuit surface of the switch device. The circuit surface is, for example, a major surface of the switch device that faces the module substrate 92. The switch device may be composed of a CMOS, for example, and specifically, may be manufactured by a SOI process. The switch device may be composed of at least one of GaAs, SiGe, and GaN. The switch 51 may be included in the integrated circuit 20.

As described above, the integrated circuits 20 and 70 and switch 51 are disposed on the major surface 92b, and the filters 61 to 66 and matching networks (chip inductors) 401, 411 to 413, 422, 431 to 433, 441 to 443, 452, and 461 to 463 are not disposed on the major surface 92b. This means that, of the plural electronic components, the electronic components that can be formed by cutting are disposed on the major surface 92b. The lower surface of the radio-frequency module 1A can therefore be formed by cutting, and the thicknesses of the resin member 95, integrated circuits 20 and 70, and switch 51 can be reduced.

The plural external connection terminals 150 include the antenna connection terminal 100, radio-frequency input terminals 111 and 112, radio-frequency output terminals 121 and 122, and control terminal 131, which are illustrated in FIG. 1, and further include ground terminals. The plural external connection terminals 150 are individually joined to input-output terminals, a ground terminal, and/or other terminals on a motherboard 1000, which is laid in the negative z-axis direction with respect to the radio-frequency module 1A. The plural external connection terminals 150 can be copper post electrodes, for example. However, the shape and material of the external connection terminals 150 are not limited thereto. Some of the plural external connection terminals 150 overlap the power amplifier 11 or 12 in a planar view and serve as heat dissipation electrodes of the power amplifiers 11 and 12 together with the inter-substrate connection terminals 151 coupled to the power amplifiers 11 and 12.

The resin member 95 covers the major surface 92b and the electronic components on the major surface 92b. The resin member 95 has a function of enhancing the reliability, including mechanical strength and moisture resistance, of the electronic components on the major surface 92b. The resin member 95 does not need to be included in the radio-frequency module 1A.

The shield electrode layer 96 is a metallic thin film formed by sputtering, for example. The shield electrode layer 96 is formed so as to cover the upper surface of the resin member 93 and lateral faces of the resin members 93 to 95 and module substrates 91 and 92. The shield electrode layer 96 is coupled to the ground and inhibits external noise from entering the electronic components constituting the radio-frequency module 1A. The shield electrode layer 96 does not need to be included in the radio-frequency module 1A.

2.1.2 Configuration of Bare SAW Device 60

Next, a bare SAW device 60 constituting each of the filters 61 to 66 is described with reference to FIGS. 6 and 7.

Figure 6:
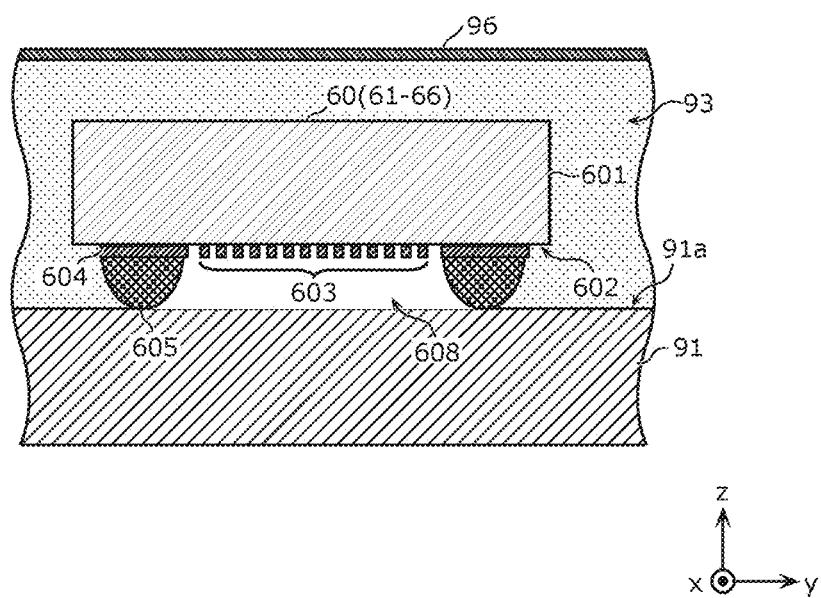
FIG. 6 is a cross-sectional view of a surface acoustic wave device and its periphery in the radio-frequency module according to Example 1.
Figure 7:
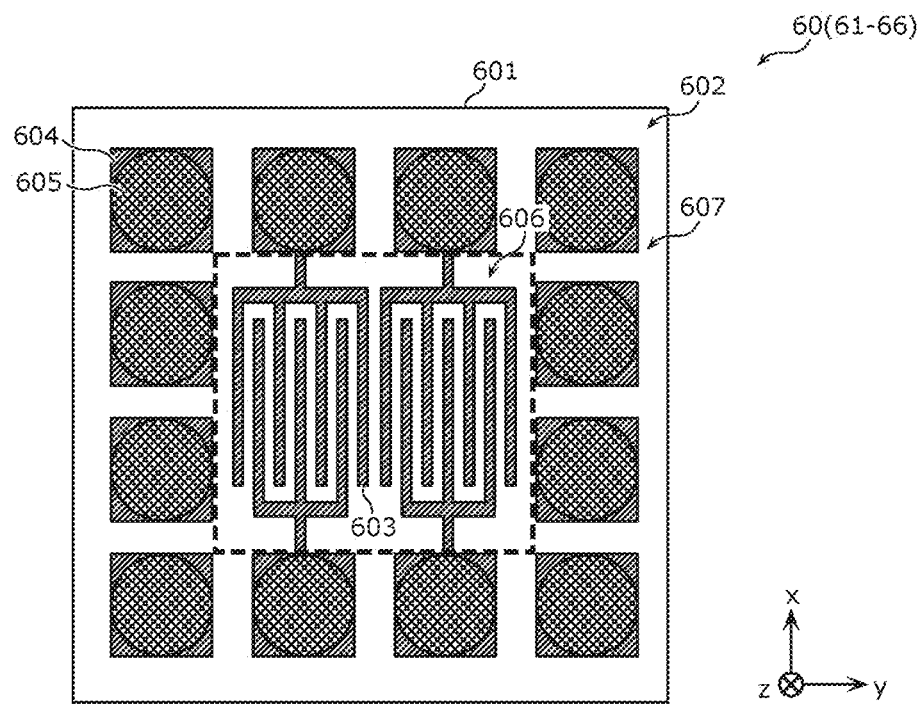
FIG. 7 is a bottom view of the surface acoustic wave device of the radio-frequency module according to Example 1.

FIG. 6 is a cross-sectional view of the bare SAW device 60 and its periphery in Example 1. FIG. 7 is a bottom view of the bare SAW device 60 in Example 1.

The bare SAW device 60 includes a piezoelectric substrate 601, an interdigital transducer (IDT) electrode 603, electrode pads 604, and bump electrodes 605.

The piezoelectric substrate 601 includes a surface 602, through which acoustic waves propagate. The surface 602 faces the module substrate 91. The piezoelectric substrate 601 is a substrate composed of a LiNbO$_3$ single crystal or a LiTaO$_3$ single crystal, for example.

The surface 602 of the piezoelectric substrate 601 is divided into a central region 606 and a peripheral region 607. The central region 606 is an example of a first region and is positioned at the center of the surface 602. The peripheral region 607 is an example of a second region and surrounds the central region 606. In FIG. 7, the dashed line indicates the boundary between the central region 606 and the peripheral region 607.

The IDT electrode 603 is disposed in the central region 606 of the surface 602 of the piezoelectric substrate 601. The IDT electrode 603 is an example of the functional electrode. The IDT electrode 603 is able to convert acoustic waves propagating through the surface 602 of the piezoelectric substrate 601 into electric signals or convert electric signals into acoustic waves. The IDT electrode 603 is mainly composed of Cu, Al, Pt, a laminate thereof, or an alloy thereof.

The electrode pads 604 are disposed in the peripheral region 607 of the surface 602 of the piezoelectric substrate 601. Some of the electrode pads 604 are electrically coupled to the IDT electrode 603. Electric signals obtained by the conversion in the IDT electrode 603 are taken out through the electrode pads 604, or electric signals are supplied to the IDT electrode 603 through the electronic pads 604.

The bump electrodes 605 are joined to the electrode pads 604, which are disposed in the peripheral region 607 of the surface 602 of the piezoelectric substrate 601. The bump electrodes 605 protrude from the surface 602 of the piezoelectric substrate 601, and the tips thereof are joined to the major surface 91a of the module substrate 91. The bump electrodes 605 are composed of high-conductivity metal (for example, solder composed of Sn/Ag/Cu or metal mainly composed of Au).

Between the central region 606 of the piezoelectric substrate 601, in which the IDT electrode 603 is disposed, and the major surface 91a of the module substrate 91, it is necessary to leave a hollow space 608 not filled with the resin member 93 for propagation of acoustic waves. The sealing process of the major surface 91a in which the bare SAW devices 60 are mounted is therefore more complicated and requires a longer time than the sealing processes of the major surfaces 91b, 92a, and 92b in which the bare SAW devices 60 are not mounted.

The bare SAW device 60 may include a protective film covering the IDT electrode 603. The protective film has a function of protecting the IDT electrode 603 and a function of adjusting the frequency-temperature characteristics. The protective film is mainly composed of silicon dioxide, for example.

2.1.3 Effect of Radio-Frequency Module 1A

As described above, the radio-frequency module 1A according to Example 1 includes: the module substrate 91, which includes the major surfaces 91a and 91b opposite to each other; the module substrate 92, which includes the major surfaces 92a and 92b opposite to each other, the major surface 92a being disposed facing the major surface 91b; the plural electronic components disposed between the major surfaces 91b and 92a, on the major surface 91a, and on the major surface 92b; the plural external connection terminals 150, which are disposed on the major surface 92b; and the resin members 93 to 95. The plural electronic components include the plural bare SAW devices 60. Each of the plural bare SAW devices 60 includes: the piezoelectric substrate 601; the IDT electrode 603, which is disposed in the central region 606 of the surface 602 of the piezoelectric substrate 601; and the plural bump electrodes 605, which are disposed in the peripheral region 607 of the surface 602 surrounding the central region 606 and which are joined to the major surface 91a. The resin member 93 covers the plural bare SAW devices 60 but does not fill between each central region 606 and the major surface 91a, to which the plural bump electrodes 605 are joined. On the major surface 91a, the plural bare SAW devices 60 are disposed, and no bare SAW devices are disposed between the major surfaces 91b and 92a and on the major surface 92b.

According to such a configuration, the plural electronic components are disposed in three layers, including between the major surfaces 91b and 92a, on the major surface 91a, and on the major surface 92b. This can implement reduction in area of the radio-frequency module 1A in a planar view, that is, reduction in size of the radio-frequency module 1A. Furthermore, among the plural electronic components, the bare SAW devices 60, which require a complicated sealing process, are disposed together on the major surface 91a (the upper layer). The sealing process of the two layers (the middle and lower layers) in which the bare SAW devices 60 are not disposed can be simpler than the sealing process of the upper layer. This can shorten the production time of the radio-frequency module 1A.

In the radio-frequency module 1A according to Example 1, for example, the plural electronic components may include plural chip inductors. The plural chip inductors may be disposed between the major surfaces 91b and 92a, and no chip inductors need to be disposed on the major surface 91a and on the major surface 92b.

According to such a configuration, the chip inductors, which are relatively tall among the plural electronic components, are disposed together between the major surfaces 91b and 92a (the middle layer). The two layers (the upper and lower layers) in which no chip inductors are disposed can be made thinner. This can reduce the height of the radio-frequency module 1A.

In the radio-frequency module 1A according to Example 1, for example, the plural electronic components may include the low-noise amplifiers 21 and/or 22, and the low-noise amplifiers 21 and/or 22 may be disposed on the major surface 92b. In the radio-frequency module 1A according to Example 1, for example, the plural electronic components may include the power amplifiers 11 and/or 12, and the power amplifiers 11 and/or 12 may be disposed between the major surfaces 91b and 92a. In the radio-frequency module 1A according to Example 1, for example, the plural electronic components may include the PA controller 71, which controls the power amplifiers 11 and/or 12, and the PA controller 71 may be disposed on the major surface 92b.

According to such a configuration, the bare SAW devices 60 can be disposed together in the upper layer, and the other electronic components can be distributed in the middle and lower layers in a well-balanced manner. It is therefore possible to simplify the production process of the radio-frequency module 1A or shorten the production time thereof as well as reducing the size of the radio-frequency module 1A.

The communication device 5 according to Example 1 includes: the RFIC 3, which processes radio-frequency signals; and the radio-frequency module 1A, which transfers radio-frequency signals between the RFIC 3 and the antenna 2.

According to such a configuration, the effects of the radio-frequency module 1A can be implemented in the communication device 5.

2.2 Example 2

Next, a radio-frequency module 1B, in which the radio-frequency circuit 1 is implemented, is described as Example 2 of the radio-frequency circuit 1 according to the above-described embodiment. Example 2 is different from Example 1 described above mostly in that the filters 61 to 66 are disposed in the middle layer. The following description of the radio-frequency module 1B according to Example 2 focuses different points from Example 1 with reference to FIGS. 8 to 11.

2.2.1 Component Position of Radio-Frequency Module 1B

Figure 8:
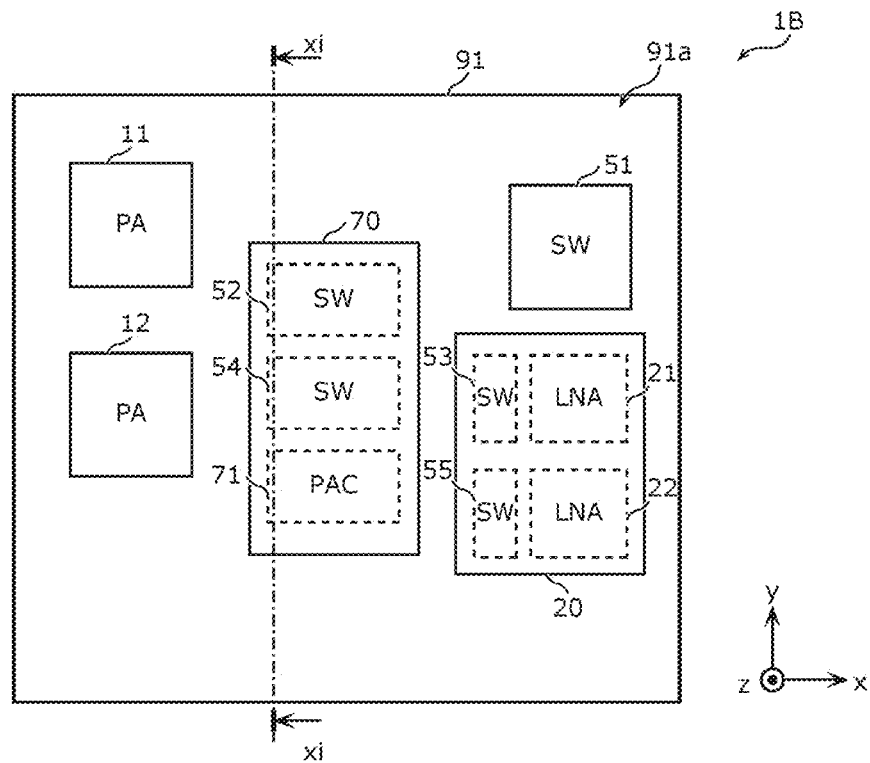
FIG. 8 is a plan view of a first major surface of a radio-frequency module according to Example 2.
Figure 9:
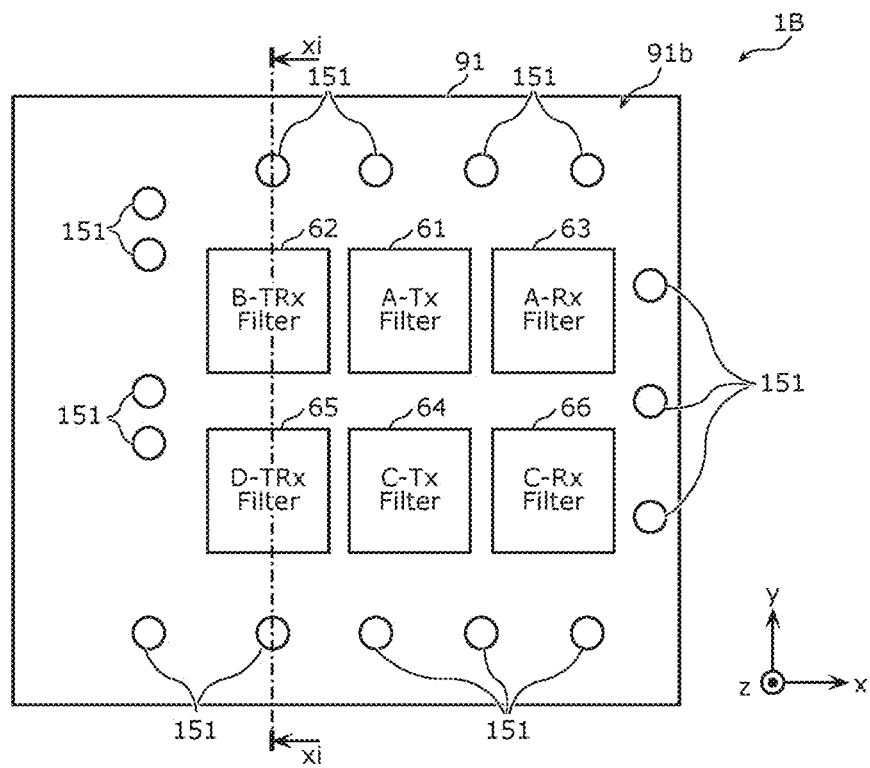
FIG. 9 is a plan view of a second major surface of the radio-frequency module according to Example 2.
Figure 10:
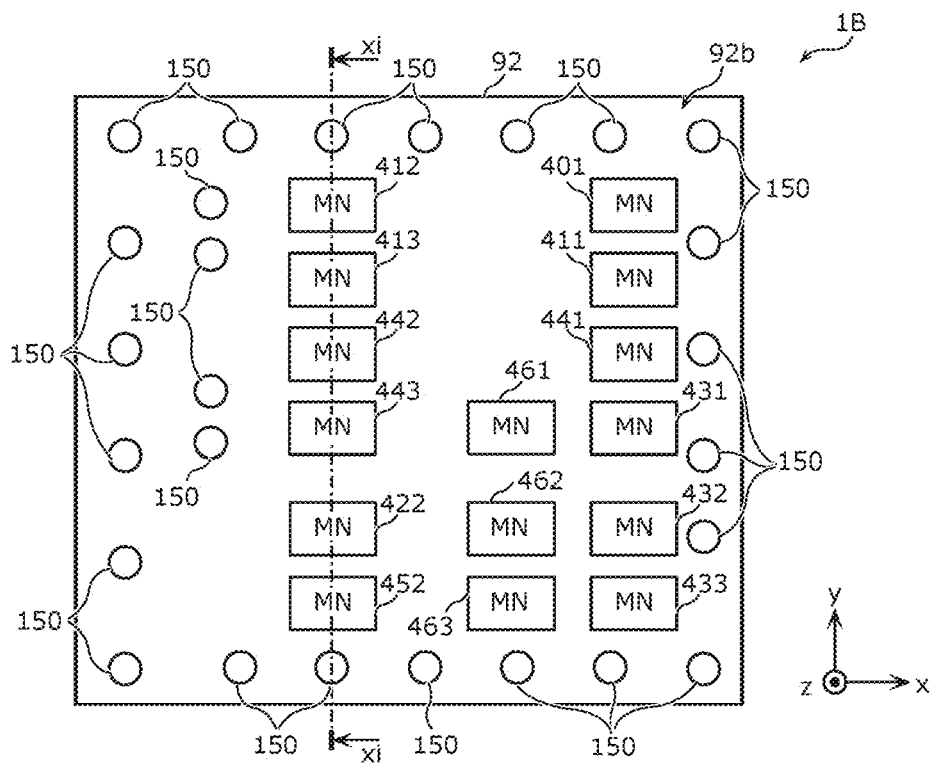
FIG. 10 is a plan view of a fourth major surface of the radio-frequency module according to Example 2.
Figure 11:
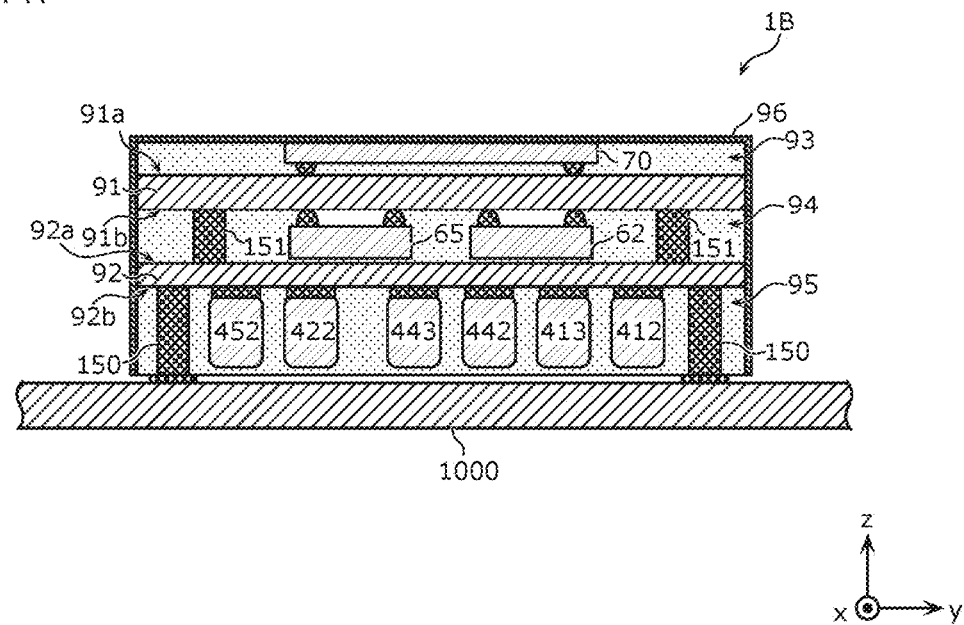
FIG. 11 is a cross-sectional view of the radio-frequency module according to Example 2.

FIG. 8 is a plan view of the major surface 91a of the radio-frequency module 1B according to Example 2. FIG. 9 is a plan view of the major surface 91b of the radio-frequency module 1B according to Example 2. FIG. 9 is a view seen through the major surface 91b side of the module substrate 91 as seen in the positive z-axis direction. FIG. 10 is a plan view of the major surface 92b of the radio-frequency module 1B according to Example 2. FIG. 10 is a view seen through the major surface 92b side of the module substrate 92 as seen in the positive z-axis direction. FIG. 11 is a cross-sectional view of the radio-frequency module 1B according to Example 2. The cross section of the radio-frequency module 1B in FIG. 11 is taken along a line xi-xi of FIGS. 8 to 10.

On the major surface 91a (the upper layer), the power amplifiers 11 and 12, integrated circuits 20 and 70, and switch 51 are disposed. The circuit element constituting each of the power amplifiers 11 and 12, integrated circuits 20 and 70, and switch 51 is formed in the circuit surface of the corresponding electronic component. The circuit surface is, for example, a major surface of the electronic component that faces the module substrate 91.

As described above, the power amplifiers 11 and 12, integrated circuits 20 and 70, and switch 51 are disposed on the major surface 91a, and the matching networks 401, 411 to 413, 422, 431 to 433, 441 to 443, 452, and 461 to 463 and filters 61 to 66 are not disposed on the major surface 91a. In other words, of the plural electronic components, the electronic components that can be formed by cutting are disposed on the major surface 91a. The upper surface of the radio-frequency module 1B can therefore be formed by cutting, and the thicknesses of the resin member 93, power amplifiers 11 and 12, integrated circuits 20 and 70, and switch 51 can be reduced.

Between the major surfaces 91b and 92a (the middle layer), the filters 61 to 66 and plural inter-substrate connection terminals 151 are disposed. This means that the bare SAW devices 60 are disposed between the major surfaces 91b and 92a but are not disposed on the major surface 91a and on the major surface 92b. That is, the bare SAW devices 60 are disposed in the middle layer of the three layers.

Herein, the bump electrodes 605 of the bare SAW devices 60 are joined to the major surface 91b of the module substrate 91. The bump electrodes 605 of the bare SAW devices 60 may be joined to the major surface 92a of the module substrate 92.

On the major surface 92b (the lower layer), the matching networks (the chip inductors) 401, 411 to 413, 422, 431 to 433, 441 to 443, 452, and 461 to 463 and plural external connection terminals 150 are disposed. No chip inductors are disposed on the major surface 91a and between the major surfaces 91b and 92a. That is, the chip inductors are disposed in the lower layer of the three layers.

2.2.2 Effect of Radio-Frequency Module 1B

As described above, the radio-frequency module 1B according to Example 2 includes: the module substrate 91, which includes the major surfaces 91a and 91b opposite to each other; the module substrate 92, which includes the major surfaces 92a and 92b opposite to each other, the major surface 92a being disposed facing the major surface 91b; the plural electronic components disposed between the major surfaces 91b and 92a, on the major surface 91a, and on the major surface 92b; the plural external connection terminals 150, which are disposed on the major surface 92b; and the resin members 93 to 95. The plural electronic components include the plural bare SAW devices 60. Each of the plural bare SAW devices 60 includes: the piezoelectric substrate 601; the IDT electrode 603, which is disposed in the central region 606 of the surface 602 of the piezoelectric substrate 601; and the plural bump electrodes 605, which are disposed in the peripheral region 607 of the surface 602 surrounding the central region 606 and which are joined to the major surface 91b. The resin member 94 covers the plural bare SAW devices 60 but does not fill between each central region 606 and the major surface 91b, to which the plural bump electrodes 605 are joined. The plural bare SAW devices 60 are disposed between the major surfaces 91b and 92a, and no bare SAW devices are disposed on the major surface 91a and on the major surface 92b.

According to such a configuration, the plural electronic components are disposed in three layers, including between the major surfaces 91b and 92a, on the major surface 91a, and on the major surface 92b. This can implement reduction in area of the radio-frequency module 1B in a planar view, that is, reduction in size of the radio-frequency module 1B. Furthermore, among the plural electronic components, the bare SAW devices 60, which require a complicated sealing process, are disposed together between the major surfaces 91b and 92a (the middle layer). The sealing process of the two layers (the upper and lower layers) in which the bare SAW devices 60 are not disposed can be simpler than the sealing process of the middle layer. This can shorten the production time of the radio-frequency module 1B.

In the radio-frequency module 1B according to Example 2, for example, the plural electronic components may include plural chip inductors. The plural chip inductors may be disposed on the major surface 92b, and no chip inductors need to be disposed between the major surfaces 91b and 92a and on the major surface 91a.

According to such a configuration, the chip inductors, which are relatively tall among the plural electronic components, are disposed together on the major surface 92b (the lower layer). The two layers (the upper and middle layers) in which no chip inductors are disposed can be made thinner. This can reduce the height of the radio-frequency module 1B.

In the radio-frequency module 1B according to Example 2, for example, the plural electronic components may include the low-noise amplifiers 21 and/or 22, and the low-noise amplifiers 21 and/or 22 may be disposed on the major surface 91a. In the radio-frequency module 1B according to Example 2, for example, the plural electronic components may include the power amplifiers 11 and/or 12, and the power amplifiers 11 and/or 12 may be disposed on the major surface 91a. In the radio-frequency module 1B according to Example 2, for example, the plural electronic components may include the PA controller 71, which controls the power amplifiers 11 and/or 12, and the PA controller 71 may be disposed on the major surface 91a.

According to such a configuration, the bare SAW devices 60 can be disposed together in the middle layer, and the other electronic components can be distributed in the upper and lower layers in a well-balanced manner. It is therefore possible to simplify the production process of the radio-frequency module 1B or shorten the production time thereof as well as reducing the size of the radio-frequency module 1B.

The communication device 5 according to Example 2 includes: the RFIC 3, which processes radio-frequency signals; and the radio-frequency module 1B, which transfers radio-frequency signals between the RFIC 3 and the antenna 2.

According to such a configuration, the effects of the radio-frequency module 1B can be implemented in the communication device 5.

2.3 Example 3

Next, a radio-frequency module 1C, in which the radio-frequency circuit 1 is implemented, is described as Example 3 of the radio-frequency circuit 1 according to the above-described embodiment. Example 3 is different from Examples 1 and 2 described above mostly in that the filters 61 to 66 are disposed in the lower layer. The following description of the radio-frequency module 1C according to Example 3 focuses different points from Example 1 or 2 with reference to FIGS. 12 to 15.

2.3.1 Component Position of Radio-Frequency Module 1C

Figure 12:
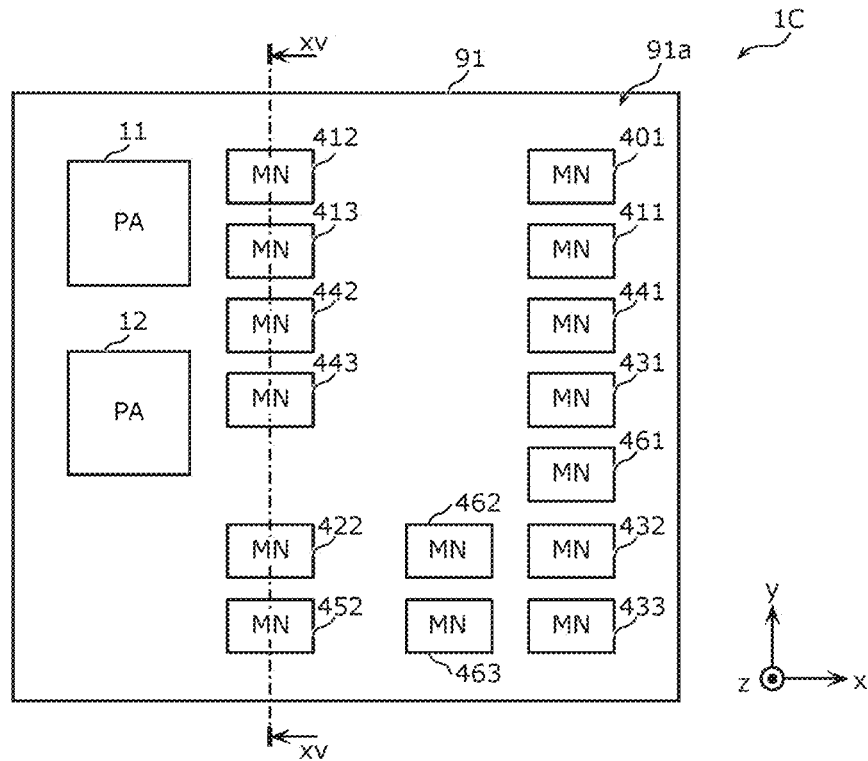
FIG. 12 is a plan view of a first major surface of a radio-frequency module according to Example 3.
Figure 13:
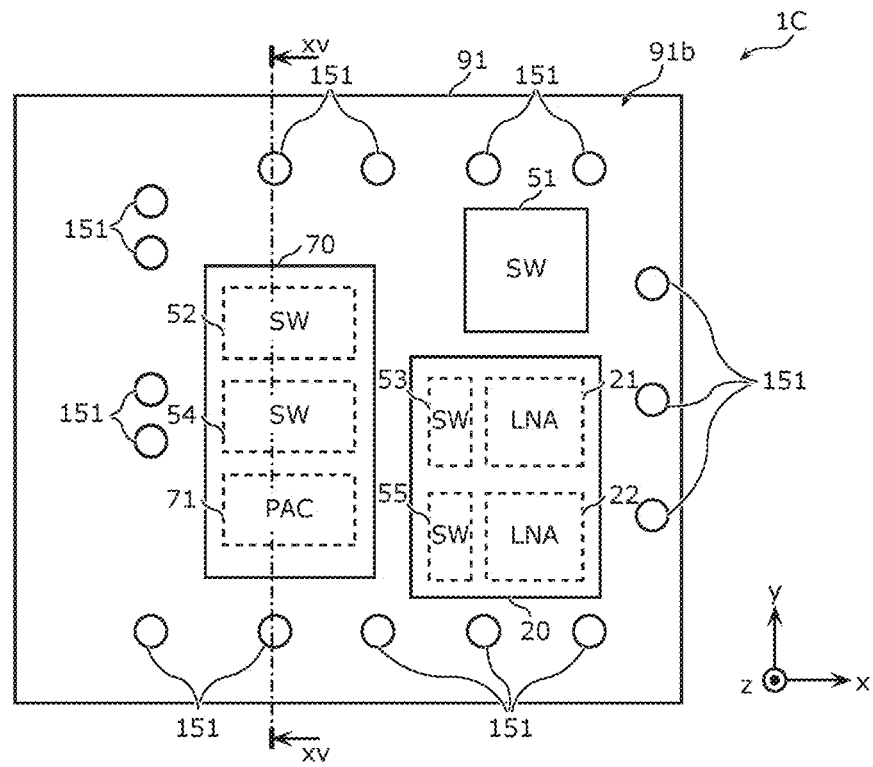
FIG. 13 is a plan view of a second major surface of the radio-frequency module according to Example 3.
Figure 14:
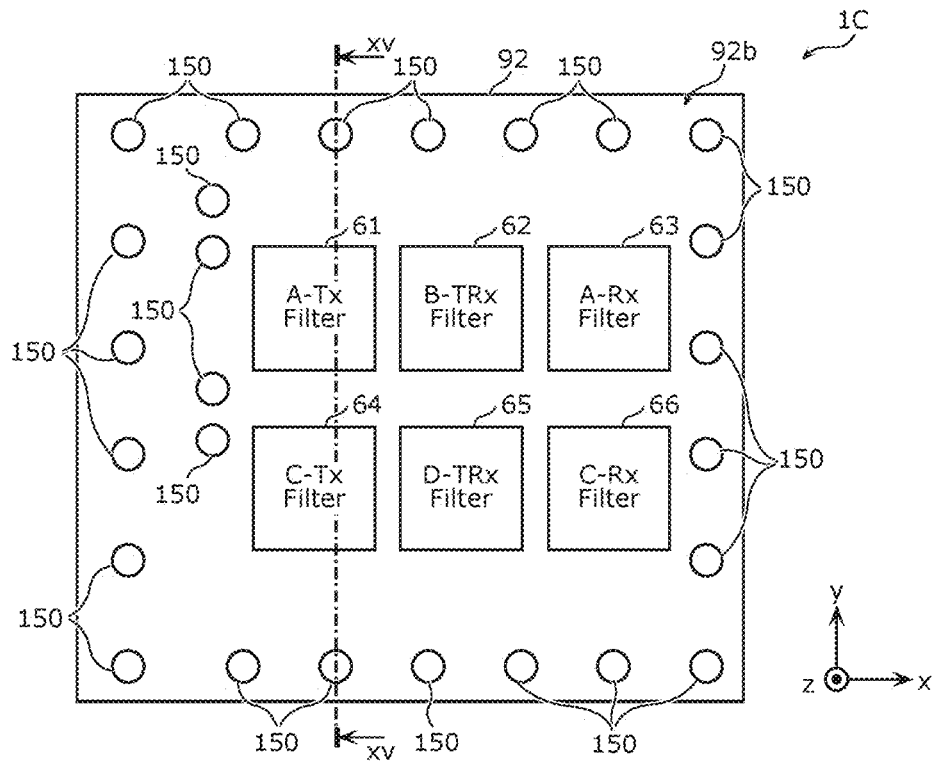
FIG. 14 is a plan view of a fourth major surface of the radio-frequency module according to Example 3.
Figure 15:
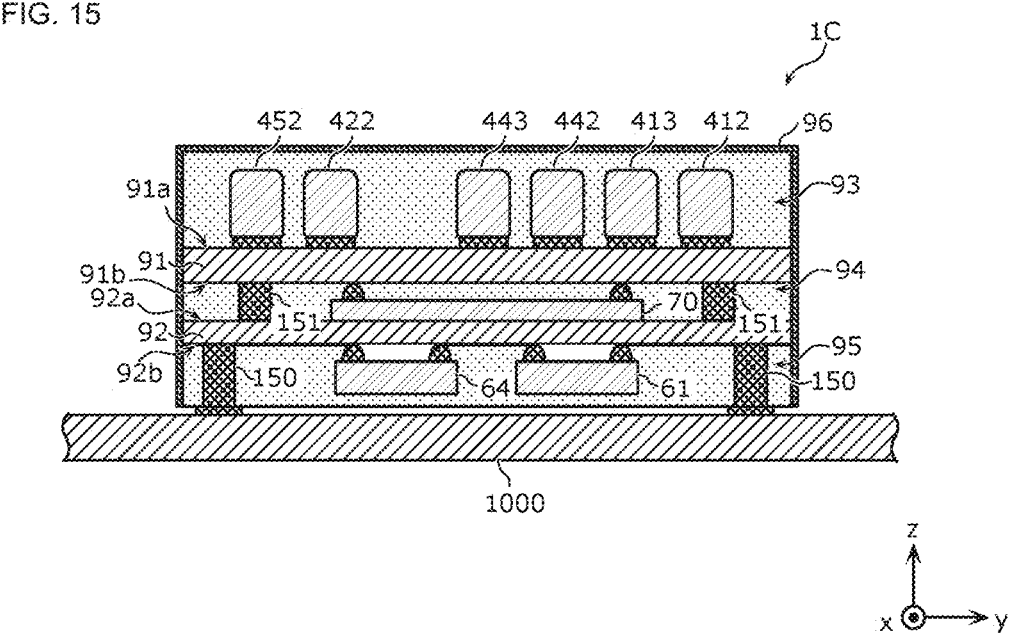
FIG. 15 is a cross-sectional view of the radio-frequency module according to Example 3.

FIG. 12 is a plan view of the major surface 91a of the radio-frequency module 1C according to Example 3. FIG. 13 is a plan view of the major surface 91b of the radio-frequency module 1C according to Example 3. FIG. 13 is a view seen through the major surface 91b side of the module substrate 91 as seen in the positive z-axis direction. FIG. 14 is a plan view of the major surface 92b of the radio-frequency module 1C according to Example 3. FIG. 14 is a view seen through the major surface 92b side of the module substrate 92 as seen in the positive z-axis direction. FIG. 15 is a cross-sectional view of the radio-frequency module 1C according to Example 3. The cross section of the radio-frequency module 1C in FIG. 15 is taken along a line xv-xv of FIGS. 12 to 14.

On the major surface 91a (the upper layer), the power amplifiers 11 and 12 and matching networks (chip inductors) 401, 411 to 413, 422, 431 to 433, 441 to 443, 452, and 461 to 463 are disposed. No chip inductors are disposed between the major surfaces 91b and 92a and on the major surface 92b. That is, the chip inductors are disposed in the upper layer of the three layers.

Between the major surfaces 91b and 92a (the middle layer), the integrated circuits 20 and 70, switch 51, and plural inter-substrate connection terminals 151 are disposed.

The plural electronic components (herein, the integrated circuits 20 and 70 and switch 51) disposed between the major surfaces 91b and 92a are electrically coupled to the module substrate 91 through electrodes disposed on the side facing the module substrate 91.

As described above, the integrated circuits 20 and 70 and switch 51 are disposed between the major surfaces 91b and 92a, and the matching networks 401, 411 to 413, 422, 431 to 433, 441 to 443, 452, and 461 to 463 and the filters 61 to 66 are not disposed therebetween. This means that, of the plural electronic components, the electronic components that can be formed by cutting are disposed between the major surfaces 91b and 92a. The module substrate 91 can be formed by cutting on the major surface 91b side, and the thicknesses of the resin member 94, integrated circuits 20 and 70, and switch 51 can be reduced.

On the major surface 92b (the lower layer), the filters 61 to 66 and plural external connection terminals 150 are disposed. This means that the bare SAW devices 60 are disposed on the major surface 92b but are not disposed between the major surfaces 91b and 92a and on the major surface 91a. That is, the bare SAW devices 60 are disposed in the lower layer of the three layers.

2.3.2 Effect of Radio-Frequency Module 1C

As described above, the radio-frequency module 1C according to Example 3 includes: the module substrate 91, which includes the major surfaces 91a and 91b opposite to each other; the module substrate 92, which includes the major surfaces 92a and 92b opposite to each other, the major surface 92a being disposed facing the major surface 91b; the plural electronic components disposed between the major surfaces 91b and 92a, on the major surface 91a, and on the major surface 92b; the plural external connection terminals 150, which are disposed on the major surface 92b; and the resin members 93 to 95. The plural electronic components include the plural bare SAW devices 60. Each of the plural bare SAW devices 60 includes: the piezoelectric substrate 601; the IDT electrode 603, which is disposed in the central region 606 of the surface 602 of the piezoelectric substrate 601; and the plural bump electrodes 605, which are disposed in the peripheral region 607 of the surface 602 surrounding the central region 606 and which are joined to the major surface 92b. The resin member 95 covers the plural bare SAW devices 60 but does not fill between each central region 606 and the major surface 92b, to which the plural bump electrodes 605 are joined. The plural bare SAW devices 60 are disposed on the major surface 92b, and no bare SAW devices are disposed between the major surfaces 91b and 92a and on the major surface 91a.

According to such a configuration, the plural electronic components are disposed in three layers, including between the major surfaces 91b and 92a, on the major surface 91a, and on the major surface 92b. This can implement reduction in area of the radio-frequency module 1C in a planar view, that is, reduction in size of the radio-frequency module 1C. Furthermore, among the plural electronic components, the bare SAW devices 60, which require a complicated sealing process, are disposed together on the major surface 92b (the lower layer). The sealing process of the two layers (the upper and middle layers) in which the bare SAW devices 60 are not disposed can be simpler than the sealing process of the lower layer. This can shorten the production time of the radio-frequency module 1C.

In the radio-frequency module 1C according to Example 3, for example, the plural electronic components may include plural chip inductors. The plural chip inductors may be disposed on the major surface 91*a*, and no chip inductors need to be disposed between the major surfaces 91*b* and 92*a* and on the major surface 92*b*.

According to such a configuration, the chip inductors, which are relatively tall among the plural electronic components, are disposed together on the major surface 91*a* (the upper layer). The two layers (the middle and lower layers) in which no chip inductors are disposed can be made thinner. This can reduce the height of the radio-frequency module 1C.

In the radio-frequency module 1C according to Example 3, for example, the plural electronic components may include the low-noise amplifiers 21 and/or 22, and the low-noise amplifiers 21 and/or 22 may be disposed between the major surfaces 91*b* and 92*a*. In the radio-frequency module 1C according to Example 3, for example, the plural electronic components may include the power amplifiers 11 and/or 12, and the power amplifiers 11 and/or 12 may be disposed on the major surface 91*a*. In the radio-frequency module 1C according to Example 3, for example, the plural electronic components may include the PA controller 71, which controls the power amplifiers 11 and/or 12, and the PA controller 71 may be disposed between the major surfaces 91*b* and 92*a*.

According to such a configuration, the bare SAW devices 60 can be disposed together in the lower layer, and the other electronic components can be distributed in the upper and middle layers in a well-balanced manner. It is therefore possible to simplify the production process of the radio-frequency module 1C or shorten the production time thereof as well as reducing the size of the radio-frequency module 1C.

The communication device 5 according to Example 3 includes: the RFIC 3, which processes radio-frequency signals; and the radio-frequency module 1C, which transfers radio-frequency signals between the RFIC 3 and the antenna 2.

According to such a configuration, the effects of the radio-frequency module 1C can be implemented in the communication device 5.

Modification

The radio-frequency module and communication device according to the present disclosure are described based on the embodiment and examples hereinabove but are not limited to the aforementioned embodiment and examples. The present disclosure includes another example implemented by a combination of any constituent elements of the aforementioned examples, modifications obtained by performing for the aforementioned embodiment and examples, various changes that can be conceived by those skilled in the art without departing from the spirit of the present disclosure, and various devices incorporating the aforementioned radio-frequency module.

In the circuit configurations of the radio-frequency circuit and communication device according to the aforementioned embodiments, for example, other circuit elements, traces, and the like may be inserted in paths connecting circuit elements and signal paths disclosed in the drawings. For example, a matching network may be inserted between the switch 51 and the filter 62 and/or between the switch 51 and the filter 65.

The positions of the plural electronic components are illustrated in the aforementioned examples by way of example and are not limited to the aforementioned examples. For example, the position of any electronic component in any of the aforementioned examples may be substituted with the position of the same electronic component in the other example. For example, the integrated circuit 70 including the PA controller 71 may be stacked on top of the power amplifiers 11 and/or 12 in Examples 1 to 3 described above. For example, in the radio-frequency module 1B according to Example 2, the integrated circuits 20 and 70 and switch 51 may be disposed on the major surface 92*b*, and the chip inductors (the matching networks 401, 411 to 413, 422, 431 to 433, 441 to 443, 452, and 461 to 463) may be disposed on the major surface 91*a*.

The plural external connection terminals 150 are copper post electrodes in Examples 1 to 3 but are not limited thereto. For example, the plural external connection terminals 150 may be bump electrodes. In this case, the radio-frequency module does not need to include the resin member 95.

In Examples 1 to 3, in the layer where the bare SAW devices 60 are disposed, the other electronic components are not disposed. However, the present disclosure is not limited thereto. For example, the bare SAW devices 60 and the power amplifiers 11 and/or 12 may be disposed in the same layer. For example, the bare SAW devices 60 and another electronic component may be disposed in the same layer.

INDUSTRIAL APPLICABILITY

The present disclosure can be widely used in communication devices, including mobile phones, as a radio-frequency module provided in the front end.

REFERENCE SIGNS LIST

1 RADIO-FREQUENCY CIRCUIT
1A, 1B, 1C RADIO-FREQUENCY MODULE
2 ANTENNA
3 RFIC
4 BBIC
5 COMMUNICATION DEVICE
11, 12 POWER AMPLIFIER
20, 70 INTEGRATED CIRCUIT
21, 22 LOW-NOISE AMPLIFIER
51, 52, 53, 54, 55 SWITCH
60 bare SAW device
61, 62, 63, 64, 65, 66 FILTER
71 PA CONTROLLER
91, 92 MODULE SUBSTRATE
91*a*, 91*b*, 92*a*, 92*b* MAJOR SURFACE
93, 94, 95 RESIN MEMBER
96 SHIELD ELECTRODE LAYER
100 ANTENNA CONNECTION TERMINAL
111, 112 RADIO-FREQUENCY INPUT TERMINAL
121, 122 RADIO-FREQUENCY OUTPUT TERMINAL
131 CONTROL TERMINAL
150 EXTERNAL CONNECTION TERMINAL
151 INTER-SUBSTRATE CONNECTION TERMINAL
401, 411, 412, 413, 422, 431, 432, 433, 441, 442, 443, 452, 461, 462, 463 MATCHING NETWORK
511, 512, 513, 514, 515, 516, 517, 521, 522, 523, 524, 531, 532, 533, 541, 542, 543, 544, 551, 552, 553 TERMINAL
601 PIEZOELECTRIC SUBSTRATE
602 SURFACE
603 IDT ELECTRODE
604 ELECTRODE PAD
605 BUMP ELECTRODE

606 CENTRAL REGION
607 PERIPHERAL REGION
608 HOLLOW SPACE
1000 MOTHERBOARD

The invention claimed is:

1. A radio-frequency module, comprising:
a first module substrate including a first major surface and a second major surface that are opposite to each other;
a second module substrate including a third major surface and a fourth major surface that are opposite to each other, the third major surface being disposed facing the second major surface;
a plurality of electronic components disposed between the second major surface and the third major surface, on the first major surface, and on the fourth major surface;
a plurality of external connection terminals disposed on the fourth major surface; and
a resin member, wherein
the plurality of electronic components include a plurality of surface acoustic wave devices,
each of the plurality of surface acoustic wave devices includes:
a piezoelectric substrate;
a functional electrode disposed in a first region of a surface of the piezoelectric substrate; and
a plurality of bump electrodes that are disposed in a second region of the surface surrounding the first region and that are joined to any one of the first major surface, the second major surface, the third major surface, and the fourth major surface,
the resin member covers the plurality of surface acoustic wave devices but does not fill between each first region and any one of the first major surface, the second major surface, the third major surface, and the fourth major surface to which the plurality of bump electrodes are joined,
the plurality of surface acoustic wave devices are disposed one of between the second major surface and the third major surface, on the first major surface, and on the fourth major surface, and
the surface acoustic wave devices are not disposed the other two of between the second major surface and the third major surface, on the first major surface, and on the fourth major surface.

2. The radio-frequency module according to claim 1, wherein
the plurality of surface acoustic wave devices are disposed on the first major surface.

3. The radio-frequency module according to claim 2, wherein
the plurality of electronic components include a plurality of chip inductors,
the plurality of chip inductors are disposed between the second major surface and the third major surface, and
no chip inductors are disposed on the first major surface and on the fourth major surface.

4. The radio-frequency module according to claim 3, wherein
the plurality of electronic components include a low-noise amplifier, and
the low-noise amplifier is disposed on the fourth major surface.

5. The radio-frequency module according to claim 4, wherein
the plurality of electronic components include a power amplifier, and
the power amplifier is disposed between the second major surface and the third major surface.

6. The radio-frequency module according to claim 5, wherein
the plurality of electronic components include a controller controlling the power amplifier, and
the controller is disposed on the fourth major surface.

7. The radio-frequency module according to claim 1, wherein
the plurality of surface acoustic wave devices are disposed between the second major surface and the third major surface.

8. The radio-frequency module according to claim 7, wherein
the plurality of electronic components include a plurality of chip inductors,
the plurality of chip inductors are disposed on the fourth major surface, and
no chip inductors are disposed between the second major surface and the third major surface and on the first major surface.

9. The radio-frequency module according to claim 8, wherein
the plurality of electronic components include a low-noise amplifier, and
the low-noise amplifier is disposed on the first major surface.

10. The radio-frequency module according to claim 9, wherein
the plurality of electronic components include a power amplifier, and
the power amplifier is disposed on the first major surface.

11. The radio-frequency module according to claim 10, wherein
the plurality of electronic components include a controller controlling the power amplifier, and
the controller is disposed on the first major surface.

12. The radio-frequency module according to claim 1, wherein
the plurality of surface acoustic wave devices are disposed on the fourth major surface.

13. The radio-frequency module according to claim 12, wherein
the plurality of electronic components include a plurality of chip inductors,
the plurality of chip inductors are disposed on the first major surface, and
no chip inductors are disposed between the second major surface and the third major surface and on the fourth major surface.

14. The radio-frequency module according to claim 13, wherein
the plurality of electronic components include a low-noise amplifier, and
the low-noise amplifier is disposed between the second major surface and the third major surface.

15. The radio-frequency module according to claim 14, wherein
the plurality of electronic components include a power amplifier, and
the power amplifier is disposed on the first major surface.

16. The radio-frequency module according to claim 15, wherein
the plurality of electronic components include a controller controlling the power amplifier, and
the controller is disposed between the second major surface and the third major surface.

17. A communication device, comprising:
a signal processing circuit processing a radio-frequency signal, and
the radio-frequency module according to claim 1 that transfers the radio-frequency signal between the signal processing circuit and an antenna.

18. A communication device, comprising:
a signal processing circuit processing a radio-frequency signal, and
the radio-frequency module according to claim 2 that transfers the radio-frequency signal between the signal processing circuit and an antenna.

19. A communication device, comprising:
a signal processing circuit processing a radio-frequency signal, and
the radio-frequency module according to claim 3 that transfers the radio-frequency signal between the signal processing circuit and an antenna.

20. A communication device, comprising:
a signal processing circuit processing a radio-frequency signal, and
the radio-frequency module according to claim 4 that transfers the radio-frequency signal between the signal processing circuit and an antenna.

* * * * *